3,140,978
PHARMACEUTICAL COMPOSITION CONTAINING COMPLEX MAGNESIUM ALUMINUM SILICATE
Margaret Rose Zentner, West Orange, N.J., assignor to Hoffmann-La Roche Inc., Nutley, N.J., a corporation of New Jersey
No Drawing. Filed Nov. 2, 1961, Ser. No. 149,539
8 Claims. (Cl. 167—55)

This invention relates, in general, to pharmaceutical preparations. More particularly, it relates to palatable, therapeutically active preparations that contain drugs which, in and of themselves, are unpleasant in taste.

Pharmaceutical preparations which are intended for use as oral medication must be pleasing in taste if they are to attain complete acceptance by the patient. Unfortunately, however, many of the highly effective drugs which are available today are characterized by an unpleasant bitter taste. It has been the practice in the past to mix such drugs with sweetening agents, flavoring agents, etc., in an effort to improve their taste. Even when this has been done, however, the blended preparations quite often are found to have the residual bitter taste of the drug itself. As a result, these drug preparations have been frequently rejected by the patient.

It is the object of this invention to provide completely palatable pharmaceutical preparations, that is, preparations which are devoid of objectionable taste.

It is a further object of this invention to provide processes for the production of such pharmaceutical preparations.

Other objects of the invention will be obvious and will in part appear hereinafter.

It has been found that when certain bitter tasting drugs are reacted with a complex magnesium aluminum silicate, the nature of which will be more fully described hereinafter, a preparation, having the full therapeutic activity of the drug itself, will be obtained which does not have the characteristic bitter taste of the drug.

In the practice of the present invention, tasteless preparations can be prepared from any basic drug having a secondary or tertiary nitrogen atom in its structure. More particularly, the invention is applicable to the preparation of drug preparations from the following named drugs: 7-chloro-2-methylamino-5-phenyl-3H-1,4-benzodiazepine-4-oxide and medicinally acceptable acid addition salts thereof, such as, the hydrochloride salt; 4-(2-dimethylaminoethoxy)-N-(3,4,5 - trimethoxybenzoyl)-benzylamine and medicinally acceptable acid addition salts thereof, such as, the hydrochloride salt; d-3-methoxy-N-methylmorphinan and medicinally acceptable acid addition salts thereof, such as the hydrobromide salt; d-1-tropic acid ester of 3-diethylamino-2,2-dimethyl-1-propanol and medicinally acceptable acid addition salts thereof, such as, the phosphate salt; 2-chloro-9-(3-dimethyl-amino propylidene)-thioxanthene; 7 - chloro-1 - methyl-5-phenyl-3H-1,4-benzodiazepin-2(1H)-one; and 1-(4-chloro-phenethyl)-2-methyl-6,7-dimethoxy - 1,2,3,4 - tetrahydro-isoquinoline and medicinally acceptable acid addition salts thereof, such as, the hydrohcloride salt. These compounds are all known in the art to have valuable therapeutic properties. Moreover, they are all bitter tasting drugs.

As has been indicated heretofore, the tasteless drug preparations of this invention are prepared by reacting a drug having a secondary or tertiary introgen atom in its structure with a complex magnesium aluminum silicate compound. Preferably, the drug preparations of this invention are prepared by reacting a bitter tasting drug, of the type herein mentioned, with a complex magnesium aluminum silicate, as, for example, a product known as "Veegum." Veegum is a standard item of commerce and it is sold under that trade name by the R. T. Vanderbilt Company, Inc., New York, New York. The chemical analysis of Veegum, expressed as oxides, is as follows:

| | Percent |
|---|---|
| Silicon dioxide | 61.1 |
| Magnesium oxide | 13.7 |
| Aluminum oxide | 9.3 |
| Titanium dioxide | 0.1 |
| Ferric oxide | 0.9 |
| Calcium oxide | 2.7 |
| Sodium oxide | 2.9 |
| Potassium oxide | 0.3 |
| Carbon dioxide | 1.8 |
| Water of combination | 7.2 |

In a more preferred embodiment of the invention, a complex magnesium aluminum silicate sold as neutral "Veegum" is employed. Neutral Veegum, like the regular grade of Veegum, is a standard item of commerce marketed by R. T. Vanderbilt Company, Inc. Neutral Veegum differs from the regular grade of Veegum in that its sodium content, expressed as sodium oxide, is about 1.0%. The regular grade of Veegum has a sodium content, expressed as sodium oxide, of about 2.9%. Moreover, in the form of a 5% by weight aqueous dispersion, neutral Veegum has a viscosity of about 100 centipoises (±50%) and a pH of about 7.5. A 5% by weight aqueous dispersion of the regular grade of Veegum has a viscosity of about 250 centipoises (±25%) and a pH of about 9.0. Finally, neutral Veegum has an acid demand of less than 1 cc. of N/10 hydrochloric acid per gram, whereas the acid demand of the regular grade of Veegum is about 6 to 8 cc. of N/10 hydrochloric acid per gram.

The regular grade of Veegum is marketed in the form of a powder. Neutral Veegum is marketed in the form of small white flakes. While particle size is not particularly critical to the operability of this invention, a complex magnesium aluminum silicate which has been reduced to a finely divided powder form is preferably used. Such a product can be obtained, for example, by passing neutral Veegum flakes through a microatomizer or through some similar device.

It should be fully understood that, while the present invention will be described with particular reference to the use of Veegum type products as the complex magnesium aluminum silicate reactant, the underlying principle of the invention is applicable equally to the use of other complex magnesium aluminum silicate compounds which are similar in nature and composition to Veegum type products.

In general, the tasteless pharmaceutical preparations of this invention are prepared by reacting a bitter drug, or a salt thereof, of the type heretofore named with a complex magnesium aluminum silicate, such as, Veegum or a similar compound. Several different methods can be used to bring about the desired reaction. The basic manipulative step involved in all of the various methods is simply one of mixing the ingredients to be reacted. Thus, for example, where it is desired to obtain the final product in the form of a dry powder, one may prepare an intimate mixture of the drug and the complex silicate compound, add thereto, and mix therewith, a small quantity of water and subsequently dry and pulverize the resulting granulation. In the alternative, one may intimately admix a solution of the drug with the silicate and, thereafter, dry, or filter and dry, and pulverize the resulting water-insoluble product. Products obtained by this method, as well as those obtained by the methods to be described hereinafter, are stable and therapeutically active. Moreover, such products will be found to be substantially devoid of any objectionable taste. These dry granulates can be incorporated readily into tablets or into lozenges or they can be suspended in a suitable vehicle as will be the case where, for example, it is desired to dispense the product in the form of a liquid or a syrup.

Where it is desired to obtain the final product directly in the form of an aqueous syrup suspension, a second method may be used. For example, where the drug in use is water-soluble, it may be added to, and dissolved in, water, preferably distilled water, following which the complex aluminum magnesium silicate is added thereto and stirred therewith. If desired, the complex silicate may be added to the aqueous solution of the drug in the form of an aqueous suspension. While the mixing operation in this method can be carried out at room temperature, or even at temperatures below normal room temperature, the desired reaction is facilitated greatly by mixing the drug and the complex silicate at an elevated temperature. In the preferred embodiment of the invention, the mixing step is carried out at a temperature within the range from about 80° C. to 95° C.

The quantity of water that is used in the foregoing method is not at all critical. If desired, one may use a relatively small quantity of water, as, for example, an amount sufficient merely to moisten the reactants to facilitate the preparation of a granulation. Moreover, one may use a quantity of water which is even greater than the amount needed to dissolve the drug and suspend the complex silicate. In general, the quantity of water used in any particular instance will be determined, at least in part, by the type of product sought to be produced. Obviously, where a dry product is to be produced, economic considerations dictate the use of the least possible amount of water since, ultimately, the water must be removed. Where, however, it is desired to produce the final product as an aqueous dispersion, greater quantities of water may be, and ordinarily are, employed.

Where the novel products of this invention are prepared in an aqueous system, they can be suspended subsequently in a suitable syrupy vehicle without first separating them from the aqueous system. For example, where it is desired to dispense the drug as an aqueous syrup suspension, the aqueous reaction product can be added directly to a suitable syrup vehicle and suspended therein by conventional means. Where it is desired, however, to obtain the product in dry powdery form, the product may be separated by filtration from the aqueous reaction medium in which it was produced and subsequently dried and pulverized. Where the product is obtained as a granulation, the granulation may be simply dried and, if desired, subsequently pulverized to a powder.

A third method for producing our novel products will be found to be applicable where the drug which is to be rendered tasteless is not soluble in water but is soluble in an aqueous alcohol solution. In this procedure, the drug is dissolved in aqueous alcohol and subsequently admixed with the complex magnesium aluminum silicate. The complex silicate can be admixed with the aqueous alcohol solution of the drug either in dry powdery form or it can be incorporated into the reaction system in an aqueous alcohol. In this embodiment of the invention, one may use any water-miscible monohydroxy aliphatic alcohol in which the drug in use is soluble. For example, in appropriate circumstances one may use methyl alcohol, ethyl alcohol, butyl alcohol, propyl alcohol, isopropyl alcohol, etc. Aqueous isopropyl alcohol is employed in the preferred embodiment of the invention. The quantity of aqueous alcohol used in this particular procedure may be varied within rather wide limits. A sufficient quantity of alcohol should be present in the aqueous alcohol system to completely dissolve the drug in use. On the other hand, the amount of water in the aqueous alcohol system should be so regulated that its presence therein will not cause the drug to precipitate out of solution. The optimum amount of aqueous alcohol to be used in this embodiment of the invention, as well as the optimum ratio of water to alcohol in the mixture, can be readily determined in any particular instance by simple preliminary experimentation.

When an aqueous alcohol system is used in preparing the products of this invention, the drug and the complex magnesium aluminum silicate can be mixed, if desired, at normal room temperature or lower. Higher temperatures, that is, any temperature up to the boiling point of the particular aqueous alcohol solution in use, can also be employed. Preferably, however, where our novel products are prepared in an aqueous alcohol system, the reaction is accomplished by mixing the reactants at a room temperature, or at a temperature up to about 45° C. Where the alcohol in use is one which is suitable for pharmaceutical use, the product obtained by this method can be suspended directly in a desired syrup vehicle without first separating it from the aqueous alcohol medium in which it was produced. In the alternative, the product may be separated from aqueous alcohol solution by drying, or by filtration and subsequent drying, and thereafter it may be pulverized to yield a fine powder.

Where the drug in use is unstable in water, or where, for some other reason, the use of water is considered to be undesirable, the drug and the complex aluminum magnesium silicate can be intimately admixed in the absence of any solvent vehicle. A small quantity of a medicinally acceptable acid may be added to, and mixed with, the dry mixture, if desired. It has been found that, in certain instances, the stability of the drug will be enhanced by the use of such an acid. The product thus obtained can be subsequently reduced to desired particle size by grinding or it can be suspended in a suitable oily vehicle, as, for example, in an edible vegetable oil.

The ratio of complex magnesium aluminum silicate to drug which is employed in producing the products of our invention has been found to be variable within rather wide limits. The ratio will, for the most part, depend upon the properties and characteristics of the particular drug being treated. However, it has been established that when one uses a ratio of at least one gram of the complex magnesium aluminum silicate, described herein, for each 0.01 millimole of the drug present, products having completely satisfactory properties will be obtained. In many instances, substantially lesser quantities of the complex silicate can be used without adversely altering the desired properties of the final product. For example, in the case of certain drugs satisfactory products have been obtained by using a ratio of as little as one gram of complex magnesium aluminum silicate for each 0.8 millimole of drug present. In any event, the optimum ratio of drug to complex silicate to be used in any particular instance can be determined readily by simple preliminary experimentation. The taste of the final drug preparation will serve as the indicia of whether the drug has been reacted with a sufficient quantity of the complex magnesium aluminum silicate.

The exact nature of the product obtained by the reaction described herein has not as yet been definitely determined. It has been established, however, that the tasteless products produced in the practice of this invention are not merely physical mixtures of the drug and the complex silicate ingredient. This is evidenced by the fact that considerable difficulty has been encountered in the laboratory in separating the active drug ingredients from the final products. Analytical methods which are normally used for assaying the various drugs cannot be used in assaying the products of this invention. Due to the nature of the product produced, it has been necessary to devise special procedures, involving, for example, alkaline-alcoholic extraction techniques, in order to liberate the drug for assay. The foregoing nothwithstanding, however, pharmacological tests, have demonstrated that the drugs comprising the various products of this invention are released from the reaction product under physiological conditions and that, when so liberated, they manifest full activity. In fact, in certain instances, it has been found that the pharmacological behavior of the product which is formed by reacting the drug with the complex magnesium aluminum silicate has been enhanced as compared to the pharmacological behavior of the drug itself. Indications of this have been found, for example, in the case of a product produced by reacting 4-(2-dimethylaminoethoxy)-N - (3,4,5 - trimethoxybenzoyl) - benzylamine hydrochloride with a complex magnesium aluminum silicate. Unexpectedly high blood levels were obtained when that product was administered in the form of a suspension. An analogous enhancement has been noted in the case of a product produced by reacting d-3-methoxy-N-methylmorphinan hydrobromide with the complex magnesium aluminum silicate. Antitussive studies conducted in conjunction with such reaction product revealed that it exhibited significantly prolonged activity as compared to drug alone.

As indicated heretofore, this invention provides tasteless pharmaceutical preparations which are stable and therapeutically active. These preparations can be obtained in powdery or granular form, suitable for use in the production of tablets, lozenges, candies, etc. Moreover, these products can be suspended in conventional pharmaceutically acceptable liquids or syrups. The various optional ingredients which are used normally in producing tablets, lozenges, suspensions, etc., of a therapeutic nature can be employed in conjunction with the present products. For example, any of the well-known coloring agents, flavoring agents, sweetening agents, preservatives, etc., can be used. However, the use of such materials is not essential.

For a fuller understanding of the nature and objects of this invention, reference may be had to the following examples which are merely given as further illustrations of the invention and are not to be construed in a limiting sense. All parts given in the examples are parts by weight, unless otherwise indicated.

*Example 1*

In this example, 400.0 grams of neutral Veegum were added with agitation to a solution composed of 102.0 grams of 4-(2-dimethylaminoethoxy)-N-(3,4,5-trimethoxybenzoyl) benzylamine hydrochloride and 1500 cc. of distilled water. The suspension thus obtained was heated with gentle agitation for thirty minutes at a temperature within the range from about 90° C. to 95° C.

Thereafter, the aqueous product was mixed with a syrup vehicle composed of the following named components in the quantities indicated:

| | | |
|---|---|---|
| Dispersing agent | grams | 75.0 |
| Sucrose | do | 2750.0 |
| Citric acid | do | 25.0 |
| Distilled water | do | 425.0 |
| Sodium hydroxide | do | 10.25 |
| Benzoic acid | do | 12.5 |
| Sorbitol | do | 500.0 |
| Di-sodium ethylene diamine tetracetate dihydrate | do | 0.5 |
| Antifoaming agent | do | 0.170 |
| Glycerine | cc | 500.0 |

Cherry flavor, q.s.
Distilled water to make 5000 cc., q.s.

A fluid suspension was obtained, free of objectionable taste and odor. Moreover, the product was found to be stable. The dispersing agent used in the foregoing formulation, was a polyoxyethylene (8) stearate sold by the Atlas Powder Company, Wilmington, Delaware, under the trademark "Myrj 45." The antifoaming agent employed was a silicone type antifoamer, having a silicone content of 30%, sold by the Dow Corning Corporation, Midland, Michigan, under the trademark "Anitfoam C."

The suspension was assayed for 4-(2-dimethylaminoethoxy) - N - (3,4,5 - trimethoxybenzoyl) - benzylamine hydrochloride immediately after its preparation. Samples of the suspension were again assayed after accelerated aging for one month at temperatures of 45° C. and 56° C. The following results were obtained:

| | Percent of drug |
|---|---|
| Found initial | 2.01 |
| Found after one month/56° C | 2.06 |
| Found after one month/45° C | 2.06 |

The suspension containing the product of this example did not have the bitter taste which normally characterizes solutions of the drug.

*Example 2*

In this example, 1 part of 4-(2-dimethylaminoethoxy)-N-(3,4,5-trimethoxybenzoyl)-benzylamine hydrochloride was mixed in a ball mill with 4 parts of neutral Veegum. This mixture was passed through a 325 mesh screen.

100.4 grams of this dry product were incorporated into a syrup having the following composition:

| | | |
|---|---|---|
| Methyl cellulose (4000 cps.) | grams | 8.0 |
| Antifoam C | do | 0.034 |
| Sodium cyclohexasulfamate | do | 5.0 |
| Sodium saccharin | do | 0.5 |
| Disodium ethylenediamine tetracetic acid | do | 0.1 |
| Sodium benzoate | do | 2.5 |
| Sodium laurylsulfate | do | 0.5 |
| Sesame oil | do | 20.0 |
| Sucrose | do | 450.0 |
| Fruit flavor | cc | 1.0 |

Citric acid to pH 4.5, q.s.
Distilled water to 1000 cc., q.s.

The suspension, thus obtained, was free of the bitter taste which characterized a solution of the drug itself. Moreover, the antiemetic activity of the suspension containing the product of this example was of the same order of magnitude as a solution of the drug itself.

*Example 3*

(a) In this example, 15.0 grams of d-3-methoxy-N-methylmorphinan hydrobromide and 85.0 grams of a neutral Veegum were ground together in a mortar and granulated by mixing with 65.0 cc. of distilled water. The granulate was dried at 45° C.

In and of itself, d-3-methoxy-N-methylmorphinan is a bitter tasting compound. The product of this example was not bitter tasting and, as such, it is well suited for use in the production of tablets, lozenges and suspensions.

(b) 89.0 grams of a neutral Veegum were added, with stirring, to a solution containing 15.0 grams of d-3-methoxy-N-methylmorphinan hydrobromide in 500 cc. of distilled water. The mixture was stirred and heated for about two hours. After standing overnight, it was filtered and washed with water until free of bromide. The filter cake was dried at a temperature of 45° C. to constant weight and subsequently pulverized.

The dry powdery product thus obtained was tasteless.

*Example 4*

In this example, 10.2 grams of 7-chloro-1-methyl-5-phenyl-3H-1,4-benzodiazepin-2(1H)-one, a bitter testing drug, was dissolved in a mixture comprising 30 cc. of isopropanol and 20 cc. of water. This solution was added to 60.0 grams of neutral Veegum and, upon intimately mixing same, a paste-like product was obtained. The paste was dried to constant weight and the dry product was thereafter pulverized. The dry product produced by this method was tasteless. It was stable and physiologically active.

*Example 5*

(a) in this example 89.9 grams of neutral Veegum were added, with stirring, to a solution of 10.1 grams of the phosphate salt of dl-tropic acid ester of 3-diethylamino-2,2-dimethyl-1-propanol dissolved in 400 cc. of distilled water. The mixture was stirred at about room temperature for two and one-half hours. After standing overnight, the mixture was filtered and the filter cake was washed with fresh water. The filter cake was thereafter dried to constant weight at a temperature of 45° C. and pulverized. A tasteless, stable and physiologically active product was thus obtained.

(b) A second product was obtained by mixing intimately 10.1 grams of the drug used in part (a) of this example with 89.9 grams of neutral Veegum and, subsequently, granulating the mixture by mixing it with 60 cc. of water. The granulate was dried at 45° C. to constant weight. A non-bitter tasting, stable and physiologically active product was obtained.

*Example 6*

(a) A dry product was prepared by intimately mixing at room temperature 0.102 gram of the hydrochloride of 7 - chloro - 2 - methylamino - 5 - phenyl - 3H-1,4-benzodiazepine-4- oxide, 4.0 grams of neutral Veegum and 0.4 gram of anhydrous citric acid.

This product was then incorporated in vehicle composed of the following named ingredients in the proportions indicated:

| | | |
|---|---|---|
| Sucrose | grams | 30.0 |
| Sodium cyclohexasulfamate | do | 1.0 |
| Saccharin | do | 0.1 |
| Butylated hydroxyanisole | mg | 0.5 |
| Butylated hydroxytoluene | mg | 2.5 |

Flavor, as needed.
Sesame oil to give 100 cc. of syrup.

The suspension, thus obtained, did not exhibit the bitter taste which ordinarily characterized conventional suspensions of this drug. Moreover, the suspension possessed the same pharmacological activity as a suspension of the drug itself.

(b) An emulsion was prepared using 0.102 gram of the hydrochloride of 7-chloro-2-methylamino-5-phenyl-3H-1,4-benzodiazepine-4-oxide, 0.9 cc. of distilled water and 4 cc. of chloroform. This emulsion was added to an intimate mixture of 4.0 grams of neutral Veegum and 0.4 gram of anhydrous citric acid and mixed therewith.

The resulting moist paste was dried at 45° C., and subsequently, pulverized. The dry powdery product was thereafter added to and suspended in the vehicle described in part (a) of this example. A suspension devoid of the bitter taste of the drug was obtained.

*Example 7*

In this example, 2.04 grams of 2-chloro-9-(3-dimethylaminopropylidene)thioxanthene was dissolved in 6.4 cc. of 10% hydrochloric acid. The solution was thereafter diluted with 300 cc. of distilled water and 60.0 grams of neutral Veegum were added thereto with stirring. The slurry thus obtained was heated for 30 minutes at a temperature of from about 80° C. to 85° C. and a syrup vehicle made up of the following named ingredients, in the quantities indicated was added thereto:

| | Grams |
|---|---|
| Myrj 45 | 15.0 |
| Duponol C | 0.05 |
| Sucrose | 550.0 |
| Sorbo | 143.0 |
| Citric acid | 10.0 |
| Benzoic acid | 2.5 |
| Disodium ethylene diamine tetracetic acid | 0.1 |
| Glycerin | 125.0 |
| Flavor | 9.5 |

Distilled water to make 1000 cc., q.s.

The syrup, thus obtained, did not have the characteristic bitter taste which normally characterizes suspensions of the drug. Moreover, unlike the conventional suspensions of the drug which have a distinct anesthetizing effect on the tongue, the suspension prepared using the product of this example did not cause numbness of the tongue.

*Example 8*

In this example, 6.3 grams of 1-(4-chlorophenethyl)-2-methyl-6,7-dimethoxy-1,2,3,4-tetrahydroisoquinoline was converted into its hydrochloride salt by reacting it in water with 24 ml. of hydrochloric acid. Thereafter, the hydrochloride salt, thus produced, was intimately mixed at room temperature with 25.0 grams of neutral Veegum and 2.0 grams of citric acid.

The product was subsequently suspended in a syrup made up of the following-named ingredients, in the proportions indicated:

| | | |
|---|---|---|
| Sugar | grams | 550.0 |
| Methyl cellulose (15 cps. viscosity) | do | 10.0 |
| Methyl - p - hydroxybenzoate | do | 1.8 |
| Propyl - p - hydroxybenzoate | do | 0.2 |
| Ethyl alcohol | ml | 11.0 |
| Coloring agent | gram | 0.02 |
| Sodium hydroxide | ml | 7.0 |

Flavoring agent, q.s.
Distilled water to make 1000 ml., q.s.

The suspension, thus obtained, did not have the bitter taste which normally characterizes solutions of 1-(4-chloro - phenethyl) - 2 - methyl - 6,7 - dimethoxy-1,2,3,4-tetrahydroisoquinoline hydrochloride.

*Example 9*

In this example, 20.0 g. of d-3-methoxy-N-methylmorphinan hydrobromide and 80.0 g. of Veegum (regular grade) were ground together in a mortar and granulated with 65.0 cc. of distilled water.

The granulate, thus obtained, was dried at a temperature of about 45° C. A product, devoid of bitter taste, was obtained.

For the sake of completeness, the preparation of the drug used in Example 4 hereof, namely, 7-chloro-1-methyl - 5 - phenyl-3H-1,4-benzodiazepin-2-(1H)-one, is given below although it should be understood that neither the compound itself nor the process for its preparation comprises part of the instant invention.

A mixture of 23.15 g. (0.1 mol) of 2-amino-5-chlorobenzophenone, 20.8 g. (0.15 mol) of glycine ethyl ester hydrochloride and 50 ml. of pyridine was heated. The pyridine was slowly distilled off while the temperature of the reaction mixture was maintained at 120 to 125° by the addition of fresh pyridine to the mixture at the same rate as it was distilled off. The distillation was continued for 4 hours, a total of 120 ml. of pyridine being collected. The mixture was then concentrated in vacuo to a syrup and partitioned between 200 ml. of benzene and 200 ml. of water. The extraction was repeated with 200 ml. of water. During the second washing, some of the product began to crystallize and was filtered off. The benzene solution was separated, diluted with 100 ml. of petroleum ether and left at 0° for 15 hours. The crystalline product, 7-chloro-5-phenyl-3H-1,4-benzodiazepin-2(1H)-one, was filtered off, washed with some benzene until almost colorless and finally with some petroleum ether. The product was then recrystallized from acetone.

1.08 g. (0.02 mol) of sodium methoxide were added to a solution of 5.4 g. (0.02 mol) of 7-chloro-5-phenyl-3H-1,4-benzodiazepin-2(1H)-one and 300 ml. of benzene. 100 ml. of benzene were distilled off in order to remove the liberated methanol, then 1.9 ml. (0.02 mol) of dimethylsulfate were added. The solution was refluxed for one hour, then washed with water, dried over sodium sulfate, filtered and concentrated in vacuo. The residue, 7-chloro-1-methyl-5-phenyl-3H-1,4-benzodiazepin - 2(1H)-one hour, then washed with water, dried over sodium sul ether, M.P. 118–120°.

I claim:

1. A stable and palatable pharmaceutical product produced by mixing complex magnesium aluminum silicate with a therapeutically active compound selected from the group consisting of (a) the hydrochloride salt of 4-(2-dimethylaminoethoxy)-N-(3,4,5-trimethoxybenzoyl) - benzylamine and (b) the hydrobromide salt of d-3-methoxy-N-methylmorphinan.

2. A stable and palatable pharmaceutical product produced by mixing complex magnesium aluminum silicate with the hydrochloride salt of 4-(2-dimethylaminoethoxy)-N-(3,4,5-trimethoxybenzoyl)-benzylamine.

3. A stable and palatable pharmaceutical product produced by mixing complex magnesium aluminum silicate with the hydrobromide salt of d-3-methoxy-N-methylmorphinan.

4. A stable and palatable pharmaceutical product produced by mixing complex magnesium aluminum silicate with the hydrochloride salt of 2-chloro-9-(3-dimethylaminopropylidene)-thioxanthene.

5. A pharmaceutical preparation, in liquid form, comprising a medicinally acceptable liquid vehicle having embodied therein a product produced by mixing complex magnesium aluminum silicate with a therapeutically active compound selected from the group consisting of (a) the hydrochloride salt of 4-(2-dimethylaminoethoxy)-N-(3,4,5-trimethoxybenzoyl)-benzylamine and (b) the hydrobromide salt of d-3-methoxy-N-methylmorphinan.

6. A pharmaceutical preparation, in liquid form, comprising a medicinally acceptable liquid vehicle having embodied therein a product produced by mixing complex magnesium aluminum silicate with the hydrochloride salt of 4-(2-dimethylaminoethoxy)-N-(3,4,5-trimethoxybenzoyl)-benzylamine.

7. A pharmaceutical preparation, in liquid form, comprising a medicinally acceptacle liquid vehicle having embodied therein a product produced by mixing complex magnesium aluminum silicate with the hydrobromide salt of d-3-methoxy-N-methylmorphinan.

8. A pharmaceutical preparation, in liquid form, comprising a medicinally acceptable liquid vehicle having embodied therein a product produced by mixing complex magnesium aluminum silicate with the hydrochloride salt of 2-chloro-9-(3-dimethylaminopropylidene) - thioxanthene.

References Cited in the file of this patent

Vanderbilt Co. Technical Bulletin, Bulletin No. 29, page 2.

UNITED STATES PATENT OFFICE
CERTIFICATE OF CORRECTION

Patent No. 3,140,978

July 14, 1964

Margaret Rose Zentner

It is hereby certified that error appears in the above numbered patent requiring correction and that the said Letters Patent should read as corrected below.

Column 1, line 65, for "introgen" read -- nitrogen --; column 6, line 61, for "10.2" read -- 1.02 --; column 8, line 72, for "one hour, then washed with water, dried over sodium sul-" read -- one, was crystallized from a mixture of ether and petroleum --.

Signed and sealed this 30th day of March 1965.

(SEAL)
Attest:

ERNEST W. SWIDER
Attesting Officer

EDWARD J. BRENNER
Commissioner of Patents